United States Patent
Scharton

[54] VIBRATION TESTING METHOD AND APPARATUS

[72] Inventor: Terry D. Scharton, Santa Monica, Calif.

[73] Assignee: Bolt Beranek and Newman Inc., Cambridge, Mass.

[22] Filed: March 24, 1967

[21] Appl. No.: 625,774

[52] U.S. Cl. .................................................. 73/71.6
[51] Int. Cl. ............................................... G01n 3/32
[58] Field of Search ..................... 73/71.4–71.6; 29/455

[56] References Cited

UNITED STATES PATENTS

| | | |
|---|---|---|
| 2,890,584 | 6/1959 | Dickie ........................ 73/71.6 |
| 3,100,393 | 8/1963 | Bell ........................... 73/71.6 |
| 2,706,400 | 4/1955 | Unholtz ....................... 73/71.6 |
| 3,369,393 | 2/1968 | Farmer ........................ 73/71.6 |

*Primary Examiner*—Jerry W. Myracle
*Attorney*—Golove and Kleinberg

[45] 3,686,927
[45] Aug. 29, 1972

[57] ABSTRACT

Vibration test methods and apparatus for qualifying equipment for use in aerospace vehicles. Multimodal vibration environments are produced for closely simulating in-flight vibration environments, to determine the capacity of the equipment to function in accordance with its intended purposes in operational vibration environments.

17 Claims, 21 Drawing Figures

PATENTED AUG 29 1972
3,686,927
SHEET 1 OF 3
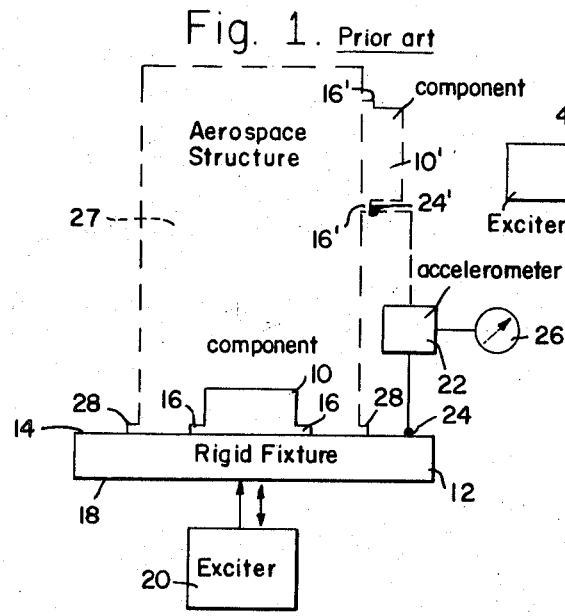
Fig. 1. Prior art
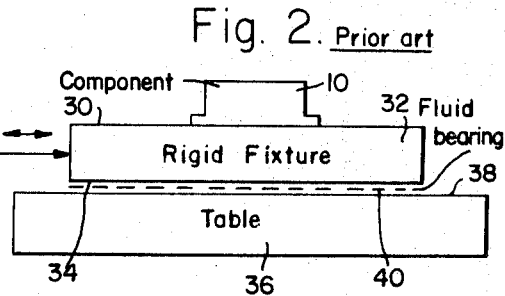
Fig. 2. Prior art
Fig. 3. Prior art
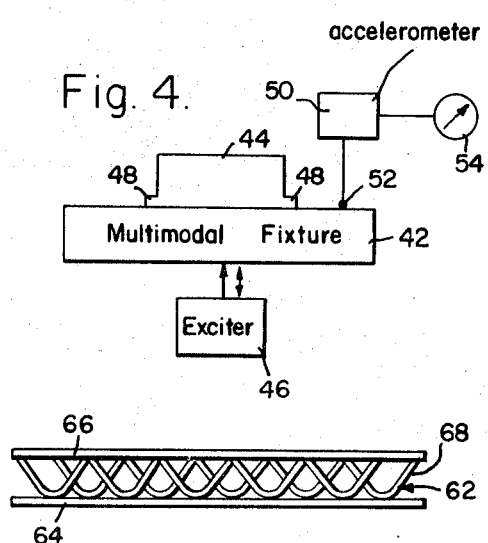
Fig. 4.
Fig. 6.
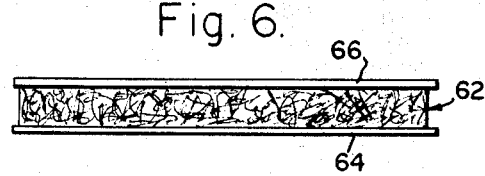
Fig. 8a.
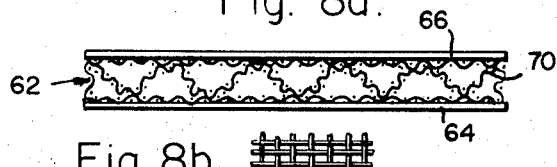
Fig. 8b.
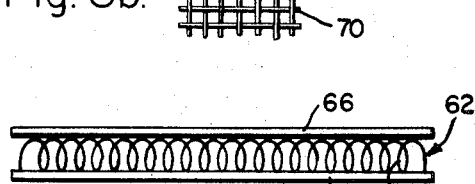
Fig. 7.
Fig. 9.
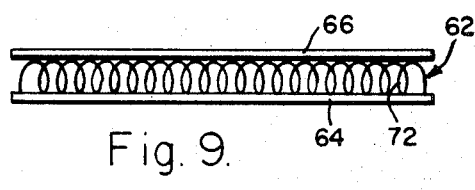
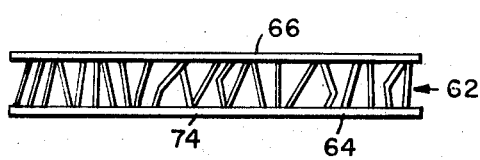
Fig. 10.
Terry D. Scharton,
INVENTOR.
BY.
GOLOVE & KLEINBERG,
ATTORNEYS.

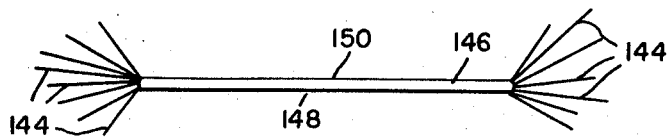
Fig. 17.
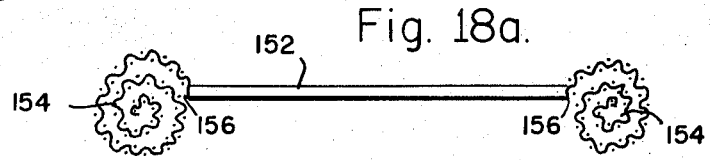
Fig. 18a.
Fig. 18b.
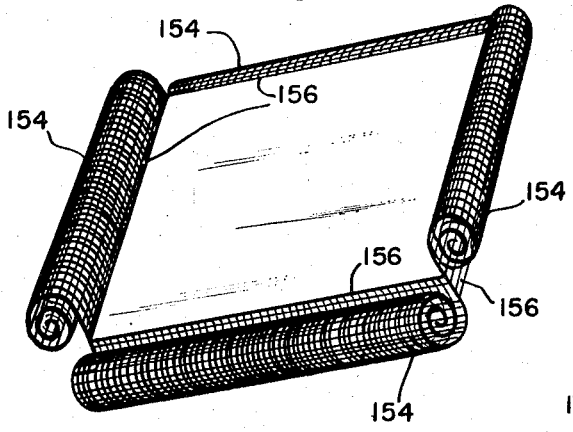
Fig. 20.
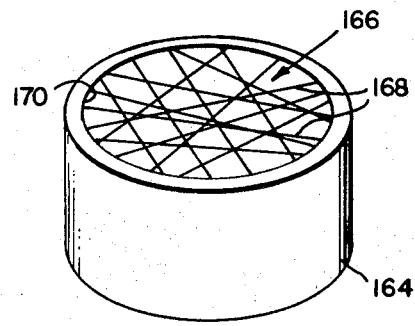
Fig. 19.
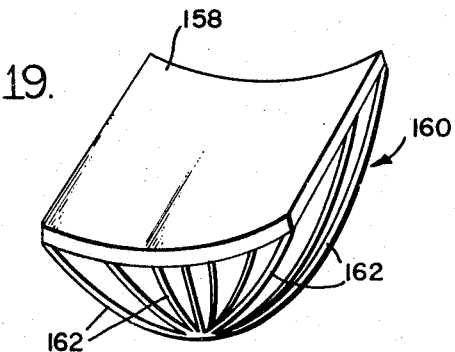

VIBRATION TESTING METHOD AND APPARATUS

This invention relates to vibration testing of equipment, and more particularly, to methods and apparatus for vibration testing of equipment required to function in aerospace vibration environments.

Equipment mounted to an aerospace vehicle is subjected to vibration environments generated in the vehicle's exterior structure during flight. Such equipment may comprise delicate electronic equipment or other equipment which is structurally delicate, and it is important that in-flight vibration environments do not prevent the equipment from functioning in accordance with the requirements imposed upon it.

In various attempts to evaluate the "functional integrity" of equipment (that is, to determine the capacity of the equipment to function in accordance with its intended purposes) in operational vibration environments, vibration tests have been devised for "qualifying" the equipment prior to service. Current practices include a series of tests where the equipment is mounted to a rigid test fixture which is vibrated along a single axis at specified high frequencies by means of a mechanical shaker or other vibration exciter. The fixture vibration level is controlled for correspondence with predetermined test specifications, and the functional integrity of the equipment in this test vibration environment is noted.

In another series of tests which is in general use, the equipment is mounted to an aerospace structure such as a large section of an aerospace vehicle, and the section base is mounted to a rigid test fixture which is in turn coupled to a mechanical shaker or other vibration exciter. The test vibration level is measured, generally at an equipment mounting position, and controlled to correspond with predetermined test specifications. The functional integrity of the equipment in this test vibration environment is noted.

Both series of tests entail vibration directed in each of three orthogonal axes, and vibration tests are performed with respect to one axis at a time, in an attempt to simulate the randomness of vibration environments experienced in flight.

The prior art vibration test methods and apparatus provide meaningful results when utilized to evaluate the functional integrity of equipment in low frequency vibration fields, such as when a missile is being raised on its launch pad or when a spacecraft is slowly wobbling in space. However, such methods and apparatus cannot simulate the type of vibration fields produced when light, flexible, aerospace structure responds to excitation containing many frequencies natural to the aerospace structure. Such excitation is characteristic of the acoustic and aerodynamic pressures acting upon the aerospace vehicle, for example, during launch and shortly thereafter.

Current practices in vibration test programs are based to a large degree on past experience with low frequency vibration conditions where problems of fixture resonance are not usually involved. Such practices encounter serious difficulties when applied to the problem of attempting to simulate the effects of vibration environments generated in the exterior structure of in-flight aerospace vehicles. These difficulties are derived from a conscious effort to avoid resonance of the test fixture.

In prior art apparatus, for example, conventional fixtures are designed to be as stiff and rigid as possible, in order that their natural or resonant frequencies are higher than the frequencies of the applied excitation. Nevertheless, the first bending or resonant vibration mode of conventional fixtures often occurs within the frequency range of interest during the vibration tests. The vibration mode associated with this first resonant frequency produces a large increase in the amplitude of the fixture vibration, which is transmitted to the equipment under test and for which compensation must be made by utilizing expensive equalization apparatus. The existence of the first bending mode also results in a spatial variation throughout the fixture vibration field, so that it is difficult to measure a representative fixture vibration level which can be related to the test specifications for excitation control.

Furthermore, conventional rigid test fixtures do not satisfactorily simulate the impedence of typical aerospace mounting configurations. Rigid fixtures provide a coherent excitation source to the equipment under test, in contrast to the incoherent excitation source provided by typical lightweight and flexible vehicle structure, so that the vibration field applied by a rigid fixture to the equipment under test is unrealistic. Vibrations transmitted by the coherent excitation source may further increase equipment vibration by causing portions of the equipment under test to resonate, under conditions where equipment resonances would not occur in response to a realistic, incoherent source.

In addition, since rigid fixtures are characteristically quite heavy, large mechanical shakers or other vibration exciters are usually required for generating the large forces required to produce the specified fixture vibration levels. At high frequencies, the power loss associated with these large forces are substantial, and in some cases conventional testing is frustrated by power limitations.

In many cases, the use of rigid test fixtures at high frequencies (e.g., above 50 cycles per second) frustrates excitation, equalization, and control endeavors, as well as resulting in expensive and unrealistic tests. The occurrence of the lower resonances in the rigid test fixtures, in addition to the unrealistically efficient transmission of vibrations by rigid fixtures, have often rendered the vibration test data essentially useless. Further, it is not an uncommon occurrence that the equipment under test is vibrated to the point of destruction in rigid fixture tests, although similar equipment had previously functioned properly in-flight under the "same" vibration levels.

It has become apparent that high frequency vibration testing of equipment, for aerospace qualification, cannot be adequately performed with methods and apparatus adapted for low frequency operation. Attempts to simulate in-flight vibration environments by utilizing stiff and rigid test fixtures to suppress the fixture resonances, are unrealistic in view of the light weight and flexible nature of aerospace vehicle structure. At the same time, conventional rigid fixture tests operating in the vicinity of the first few fixture resonances provide greatly amplified vibrations which are difficult to relate to test specifications.

The present invention provides methods and apparatus for vibration testing equipment for aerospace qualification, and includes apparatus for generating test vibration fields simulating in-flight vibration fields and for applying the generated fields to the equipment under test. The functional integrity of the equipment during exposure to a generated test vibration field is observed, for evaluating the functional integrity of the equipment when exposed to in-flight vibration environments. The methods and apparatus are conceptually based upon a consideration of characteristic vibration fields generated by aerospace vehicle structure when excited by high frequency energy sources, such as provided by acoustic and aerodynamic forces acting upon the aerospace vehicle exterior structure.

Contemporary aerospace vehicle structure is typically lightweight and flexible. For example, a launch vehicle "skin" or a space craft "shroud" commonly includes an assemblage of interconnected, thin, flexible members, such as metal "honeycomb" or trusses sandwiched between thin, metal panels. The high frequency energy which is applied to the exterior structure in flight, contains many frequencies natural to the flexible members included in the exterior structure, and these members respond thereto by vibrating in various resonant vibration "modes," or stationary wave patterns describing reverberant vibration. Each vibrating member, which vibrates in a number of modes corresponding to the number of resonances excited therein by the multi-frequency energy, is additionally affected by the reverberant vibrations of the other members. The reverberant vibrations "diffuse" or spread throughout the complex of interconnected flexible members comprising the exterior structure. The vibration field generated by the exterior structure and which is applied to equipment coupled to the structure, is characteristically reverberant and diffuse, resulting from the simultaneous excitation of a large number of resonant modes. Accordingly, these vibration characteristics will hereinafter be termed "multimodal."

The test methods of the present invention include the generating of multimodal vibration fields which are applied to the equipment under test, and which simulate in-flight multimodal vibration environments applied to the equipment in actual service. Oscillatory energy is applied to a novel type of test fixture, which is adapted to respond to the applied energy by vibrating in a plurality of resonant modes, generating a multimodal vibration field which may be controlled in accordance with predetermined test specifications. The equipment under test, which is coupled to the fixture, responds to the generated multimodal vibration field in much the same manner as it would respond to its in-flight vibration environment, and the functional integrity of the equipment during the test is observed.

The generation of multimodal vibration fields which simulate in-flight vibration environments, is accomplished by utilizing apparatus coupled between at least one source of oscillatory energy and the equipment under test. Such apparatus is adapted to have many vibration resonances in any test frequency bandwidth, and excitation in any frequency band excites a large number of vibration modes, resulting in the generation of a reverberant and diffuse (or multimodal) vibration field which is applied to the equipment under test. Such apparatus, which can be made to vibrate in many modes, will hereinafter be termed a "multimodal fixture."

For example, a multimodal fixture may comprise a flexible member, such as a thin walled, flexible cylinder, or a simple, flexible plate or panel. Rather than operating below or in the vicinity of its first few resonances, the panel (for example) vibrates in a plurality of resonant modes when excited by a band of high frequency noise.

Although the spatial variation in the response of a prior art rigid fixture vibrating in a single mode is quite large, the vibration field of a flexible panel responding in many modes as taught in the present invention, is generally quite uniform throughout the panel. In fact, the spatial uniformity in the mean square acceleration of the panel is proportional to the number of structural modes excited.

If a flexible panel were excited only at a single point, the spatial uniformity of the panel response would be partially destroyed when the panel is loaded by the equipment under test. However, unlike a rigid fixture, the vibration field exhibited by a multimodal structure is characteristically insensitive to the details of the applied excitation, so that multipoint excitation can be utilized to increase the spatial uniformity of the loaded panel. For example, a plurality of small exciters or shakers (not necessarily in phase) can be employed to excite the panel at various positions thereon, instead of utilizing a single large shaker customary in prior art apparatus.

Another way of preserving spatial uniformity of multimodal response is to couple at least one flexible truss framework to the panel at a number of points, and to excite the frameworks by at least one excitation source.

As the fixture configurations became more structurally complex by the coupling of additional flexible members to the panel, the composite system becomes more greatly enriched in its modal response within any measurement bandwidth. Indeed, the interactions of many flexible systems, each of which exhibit vibration modes corresponding to resonances in a particular frequency bandwidth, contribute to the total number of modes exhibited by the composite system. For example, the total number of modes exhibited by a panel with attached flexible beams is approximately equal to the sum of the number of modes exhibited by the panel individually and the number of modes of each of the individual beams.

Since the number of modes of component systems are additive to provide the composite system modal response, it follows that the more components having resonant frequencies within a specified bandwidth, the greater will be the number of vibration modes exhibited by the fixture within the bandwidth, or the greater will be the fixture "modal density." Furthermore, the greater the modal density of each of the component systems, the greater will be the fixture modal density.

The modal densities of component members are strongly influenced by their geometric characteristics. For example, the modal density of a panel is directly proportional to its area and inversely proportional to its thickness, while the modal density of a beam is directly proportional to its length and inversely proportional to the square root of its thickness. Accordingly, the fixture configurations may be comprised of complex assemblages of long, narrow, flexible beam members and thin, flexible panel or plate members.

For example, the preferred fixture embodiment is comprised of a complex assemblage of flexible members, such as narrow beams and thin plates, coupled between two substantially parallel flexible plates or panels. One of these panels is coupled to the equipment under test, while the other panel may be excited either by one large shaker or by a plurality of smaller shakers or exciters.

Because of the light, flexible construction characteristics of multimodal test fixtures, similar to aerospace vehicle structure, the impedance of typical aerospace mounting configurations are much better simulated in multimodal fixtures than in conventional rigid fixtures. The coherent excitation sources provided by the conventional rigid test fixtures severely overtest the equipment which, in service, are attached to lightweight structure and subjected to incoherent excitation sources. The ability of multimodal fixtures to simulate impedances of aerospace mounting configurations results in realistic correlation to vibration test specifications.

Vibration test specifications are commonly determined from in-flight vibration measurements at structural interfaces, or equipment mounting positions. The formulation of these specifications for conventional vibration tests is complicated by problems inherent to the rigid test fixtures, involving unrealistic fixture impedances, fixture resonances in the vicinity of the first vibration mode, and in some cases power limitations incident to heavy fixtures, as discussed earlier. Each of these problems is avoided by the provision of lightweight, multimodal fixtures taught by the present invention.

The practice of formulating vibration test specifications from interface measurements presents a further difficulty concerning the relating of test vibrations to in-flight vibrations. Interface vibration measurements on typical aerospace structure may be quite sensitive to the details of the attached equipment. It is often difficult, for example, to formulate a meaningful test specification level for particular equipment from in-flight interface vibration measurements performed with different equipment. Such problems can be avoided when multimodal fixtures are utilized in the vibration tests, by relating the fixture multimodal vibration level to the multimodal vibration level of the in-flight aerospace vehicle structure, which is rather insensitive to the details of the attached equipment. For example, vibration test specifications may be determined from in-flight measurements on aerospace multimodal structure such as the vehicle skin or spacecraft shroud. This in-flight multimodal vibration level can then be utilized to set the multimodal vibration test levels on the multimodal fixtures, measured at a point somewhat remote from the fixture-equipment interface.

In addition to multimodal fixtures which simulate typical vibration fields produced by contemporary aerospace construction, other multimodal test fixtures may be designed for simulating specific vibration fields produced by particular aerospace mounting structure. Utilization of such fixtures, produced on an ad hoc basis upon development of specific vehicle structure, generates vibration fields which simulate in-flight environments better than those generated in prior art test apparatus utilizing a large section of a particular aerospace vehicle (or the complete vehicle or a model thereof) coupled to a conventional rigid fixture. In these prior art tests, furthermore, the combination of the heavy fixture and the large vehicle structure present problems of power deficiencies and vehicle structure support. In addition, the providing of the particular vehicle structure for mounting the equipment under test in very expensive, and complex size-effect problems are presented if a scaled down model of the vehicle or a section of the vehicle is used. Of course, excitation specification control problems (including first fixture resonance and fixture coherence) are still present, although the effects of these latter problems upon the equipment under test are somewhat lessened because of the multimodal nature of the aerospace mounting structure. Further, the problem of damaging the structure in the vicinity of the rigid fixture, particularly at the first fixture resonance, is present.

In place of the current practice described above, a multimodal fixture having vibration characteristics simulating particular aerospace structure can be provided. Such a fixture includes a relatively small "section of an aerospace vehicle" (hereby defined to include a member which structurally simulates a section of an aerospace vehicle), to which additional multimodal elements are attached. The modal density inherent to the section is thereupon enriched and the multimodal vibration field generated when the fixture is excited is characterized by the increased modal density of the section. Although excitation may be provided by one large shaker, the utilization of a number of smaller shakers is preferred for increasing the spatial uniformity of the fixture response.

For example, the vibration characteristics of a particular vehicle can be simulated by utilizing a "section" of the vehicle skin and attaching assemblages of flexible members, such as beam or plate configurations, to the section. Since the total multimodal response of the fixture is approximately equal to the sum of the individual responses of its component multimodal elements (i.e., the original section and the added members), the modal density of the section has thus been enriched, to simulate the modal density of the complete vehicle. The effect of enriching the modal density of the small section is to cause attached equipment to be subjected to a test vibration environment which very nearly simulates its in-flight vibration environment.

An important advantage of the vibration test method of the present invention, is related to the diffuse property of the multimodal vibration fields generated by multimodal fixtures. Multimodal vibration is characteristically quite insensitive to the details of the excitation, so that the direction and exact location of the excitation is relatively unimportant in determining the fixture response. Besides permitting the utilization of multipoint excitation, as discussed earlier, the diffuse vibration fields generated by multimodal fixtures avoid the necessity of performing separate vibration tests along each of three mutually orthogonal axes, since the equipment attached to the excited multimodal fixture is vibrated in all directions simultaneously.

It is an object of the present invention to provide a method of vibration testing equipment which is to be utilized in a multimodal vibration environment, to determine the functional integrity of the equipment prior to actual service.

It is another object of the present invention to provide a method of vibration testing equipment which is to be utilized in a multimodal vibration environment produced by in-flight excitation of typical aerospace mounting structure.

It is a further object of the present invention to provide a method of vibration testing equipment which is to be utilized in a multimodal vibration environment produced by in-flight excitation of particular aerospace mounting structure.

It is yet another object of the present invention to provide apparatus for generating a multimodal vibration field which simulates inflight vibration environments in aerospace vehicle structure.

It is another object of the present invention to provide apparatus for generating a multimodal vibration field when oscillatory energy is applied thereto, and for applying the generated field to equipment under test.

It is a still further object of the present invention to provide apparatus for generating a multimodal vibration field simulating an actual vibration field environmental to equipment in service.

It is yet another object of the present invention to provide a vibration test fixture having many resonant modes of vibration excited by at least one frequency component of applied oscillatory energy.

It is another object of the present invention to provide a vibration test fixture for generating a reverberant and diffuse vibration field which vibrates the equipment under test in all directions simultaneously.

It is still another object of the present invention to provide a vibration test fixture which includes a section of particular multimodal structure and which further includes means for enriching the modal density of the section.

It is a further object of the present invention to provide a vibration test fixture which utilizes a section of an aerospace vehicle, for generating a vibration field which is characteristic of the complete vehicle.

The novel features which are believed to be characteristic of the methods and apparatus of the present invention, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

FIG. 1 is a part elevation and part block diagram of conventional rigid fixture vibration test apparatus, for vibrating equipment along a vertical axis;

FIG. 2 is a part elevation and part block diagram of conventional rigid fixture test apparatus, for vibrating equipment along a horizontal axis;

FIG. 3 is a side view of the rigid fixture of FIG. 1, exhibiting its first resonance;

FIG. 4 is a block diagram of vibration test apparatus according to the the present invention;

FIG. 6 is a side view of a preferred embodiment of a multimodal fixture according to the present invention;

FIG. 7 is a side view of a first example of the preferred fixture embodiment shown in FIG. 6;

Figure 11:
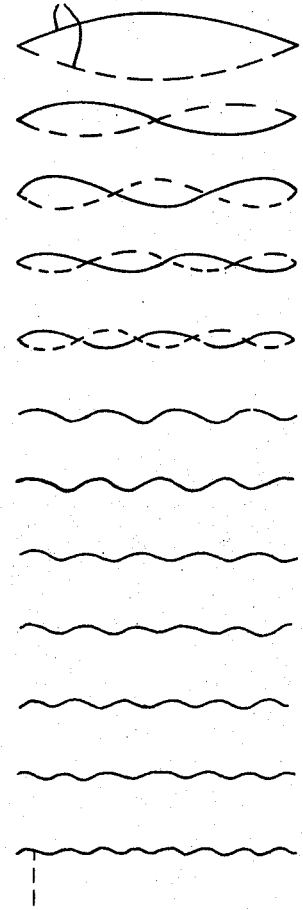
Figure 11:
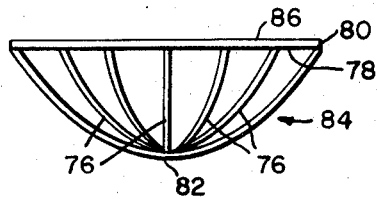
Figure 12:
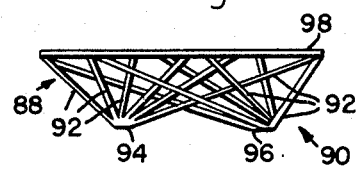
Figure 14:
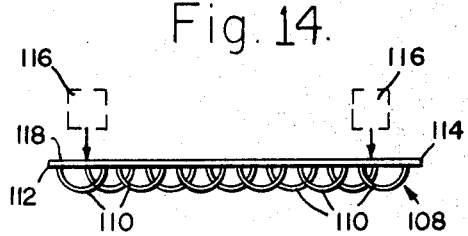
Figure 13:
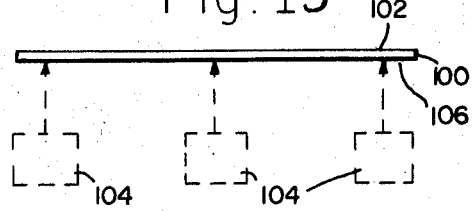
Figure 15:
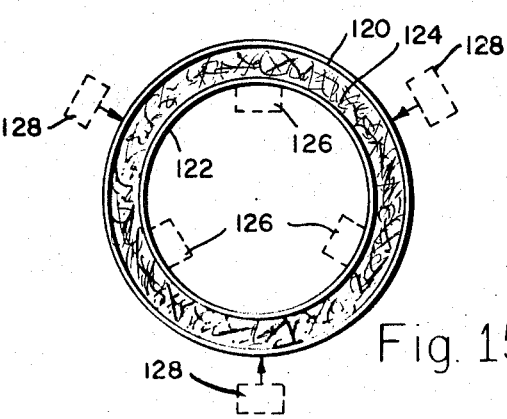
Figure 16:
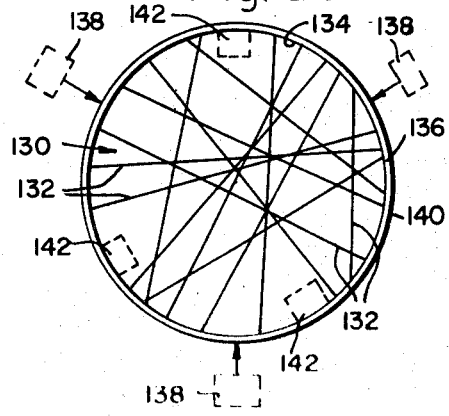

FIG. 8 including FIGS. 8a and 8b is a side view of a second example of a fixture embodiment; and a top view of a component element, respectively;

FIG. 9 is a side view of a third example of a fixture according to the present invention;

FIG. 10 is a side view of a fourth example of a fixture according to the present invention;

FIG. 11 is a side view of a first alternative embodiment of a multimodal fixture according to the present invention;

FIG. 12 is a side view of a second alternative embodiment of a multimodal fixture according to the present invention;

FIG. 13 is a side view of a third alternative embodiment of a multimodal fixture according to the present invention;

FIG. 14 is a side view of a fourth alternative embodiment of a multimodal fixture according to the present invention;

FIG. 15 is a plan view of a fifth alternative embodiment of a multimodal fixture according to the present invention;

FIG. 16 is a plan view of a sixth alternative embodiment of a multimodal fixtrue according to the present invention;

FIG. 17 is a side view of a seventh alternative embodiment of a multimodal test fixture, utilizing a section of an aerospace vehicle;

FIG. 18a is a side view of a further example of the seventh alternative embodiment of a multimodal test fixture, utilizing a section of an aerospace vehicle;

FIG. 18b is a perspective view of the multimodal fixture shown in FIG. 18a;

FIG. 19 is a perspective view of one example of an embodiment of a multimodal test fixture, utilizing a section of an aerospace vehicle; and FIG. 20 is a perspective view of a second example of an embodiment of a multimodal test fixture utilizing a section of an aerospace vehicle.

Turning first to FIG. 1, there is shown prior art apparatus for vibration testing equipment such as a "component" 10, along a vertical axis, by conventional techniques utilizing a rigid fixture 12. The rigid fixture 12 is commonly a slab of aluminum or magnesium, generally several inches thick in order that it be as stiff and rigid as possible. The component 10 is mounted to upper surface 14 of the rigid fixture 12, by mounting members 16 attached to both the component 10 and the upper surface of the rigid fixture 12. Lower surface 18 is rigidly coupled at a centralized location to a shaker or other vibratory exciter 20, for vertically reciprocating the rigid fixture 12. The resulting vibrations of the upper surface 14 in the vicinity of the component 10 are thereupon transmitted to the component 10 which vibrates in response thereto.

The fixture vibration level is measured by means of a transducer, such as an accelerometer 22 having a feeler element 24 engaging the rigid fixture 12 at a "representative" location on its upper surface 14 (i.e., a location at which a measured vibration level is assumed to be representative of vibration levels throughout the upper surface), and further including readout means 26. The vibratory force from the exciter 20 is adjusted until the fixture vibration response, measured by the accelerometer 22, corresponds to predetermined vibration test specifications. The functional integrity of the component 10 in this test vibration environment is observed.

In an alternative test, a component 10' is mounted to aerospace structure 27, such as an aerospace vehicle, a model of an aerospace vehicle, or a large section of an aerospace vehicle. The aerospace structure 27 is mounted to the upper surface 14 of the rigid fixture 12 by mounting members such as brackets 28, and the component 10' is mounted to the aerospace structure 27 by means of mounting members 16'. When the rigid fixture 12 is vibrated by the exciter 20, the accelerometer 22 measures the level of vibrations influencing the component 10', such as by engaging an accelerometer feeler element 24' with a mounting member 16'. The vibration force from the exciter 20 is adjusted so that the accelerometer response corresponds to predetermined test specifications, and the functional integrity of the component 10' in this alternative test vibration environment is observed.

Since the vibration field which the test apparatus attempts to simulate is omnidirectional, it is the general practice to perform additional vibration tests on the component, where the vibrations are directed along each of two mutually orthogonal horizontal axes. For example, the component 10 or the aerospace structure 27 with component 10' attached, is removed from the vertical vibration test apparatus of FIG. 1 and is coupled to the test apparatus of FIG. 2 for vibrating the component along the horizontal axes.

Turning to FIG. 2, the component 10 (or an aerospace structure with component attached, not shown) is mounted to upper surface 30 of a conventional rigid fixture 32. The rigid fixture 32 is commonly a thick slab or ring of aluminum or magnesium, and has a substantially flat lower surface 34. The rigid fixture 32 is slideably supported by a table 36 which has a substantially flat, smooth, upper surface 38, customarily provided by a highly ground surface of a marble slab. A fluid bearing 40 is situated between the fixture lower surface 34 and the table upper surface 38, to permit horizontal movement of the rigid fixture 32 over the stationary table upper surface 38. The fluid bearing 40 may be a film of either a liquid or gaseous substance, and means (not shown) are usually provided for maintaining the fluid bearing 40. A shaker or other vibration exciter 41 is coupled along a first horizontal axis of the rigid fixture 32, for producing horizontal vibrations in the rigid fixture along this first horizontal axis, which vibrations are transmitted to the component 10. The fixture vibration response is measured at a "representative" location, in the same manner as in FIG. 1, for controlling excitation in accordance with the predetermined test specifications, and the functional integrity of the component 10 is observed.

After the component 10 is vibration tested along the first horizontal axis, the exciter 41 is repositioned with respect to the rigid fixture 32 for producing vibrations along a second horizontal axis orthogonal to the first horizontal axis. The component 10 is thereupon vibration tested along the second horizontal axis, in accordance with the method previously described.

In the prior art apparatus, the conventional fixtures are designed to be as stiff and rigid as possible, in order that all of their resonant frequencies are higher than the frequencies of the applied excitation. Nevertheless, the first resonance of conventional fixtures often occurs within the frequency range of interest during vibration tests, resulting in large increases in fixture acceleration as well as a spatial variation throughout the fixture vibration field.

In FIG. 3, for example, the rigid fixture 12 of the apparatus shown in FIG. 1, is shown exhibiting the bending mode which is excited by the fixture's first resonant frequency. The increase in vibration amplitude and the spatial variation in the fixture vibration level throughout the upper surface 14 of the rigid fixture 12 is indicated from the drawing.

Turning to FIG. 4, there is shown vibration test apparatus according to the present invention. Instead of utilizing a rigid test fixture to suppress the fixture resonances, as in the prior art test apparatus, the apparatus of the present invention includes a multimodal test fixture 42, which generates a reverberant and diffuse vibration field and applies the generated field to an attached component 44, when excited by oscillatory energy from at least one coupled vibration exciter 46. The component 44 is coupled to the multimodal fixture 42 by mounting members 48 which simulate mounting configurations of the component in an aerospace vehicle.

The fixture vibration level is measured at a representative position on the multimodal fixture 42, by means of a transducer such as an accelerometer 50 having a feeler element 52 and readout means 54. The exciter 46 is controlled to provide a measured vibration level which corresponds to the test specifications, and the functional integrity of the component 44 is observed. Although the vibration measurements may be performed at or near one of the component mounting members 48, it is preferred that the measurements be performed at a location on the multimodal fixture 42 somewhat distant from the component 44. It is further preferred that the test specifications be formulated from in-flight vibration measurements on the vehicle multimodal structure, instead of the current practice of formulating the vibration test specifications from in-flight vibration measurements at equipment mounting positions. The multimodal vibration test level can thereupon be controlled for correspondence with the preferred test specifications so that both the character and the level of the vibration field generated by the multimodal fixture 42 and applied to the component 44 simulates the character and level of the in-flight vibration field.

Figure 5:
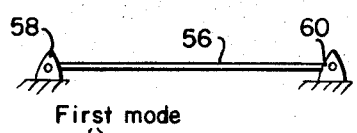
FIG. 5 is a series of representative resonant vibration modes of a flexible beam.

The multimodal vibration field generated by the multimodal fixture 42 can be better described with reference to FIG. 5, which illustrates a number of bending or vibration modes associated with different resonant frequencies of a thin, flexible beam 56 whose ends are supported by hinges 58, 60. The first pattern shown beneath the beam 56 is a representation of the mode experienced by the beam when excited by energy which includes the beam's first resonant frequency.

This first vibration mode is a stationary pattern having nodes at the beam ends and an antinode at its center; the beam vibrates through a large amplitude at its center. Other vibration modes are represented in FIG. 5, in increasing order of resonant frequency, each showing the beam to vibrate in sinusoidal stationary patterns. As the order of the resonant frequency is increased, the wavelength of the corresponding vibration mode exhibited by the beam 56 is decreased; the amplitude of vibration is correspondingly decreased. Although all vibration modes describe stationary patterns, the representation of modes having an order higher than five are shown in FIG. 5 as simple sine waves. Furthermore, the beam 56 has a very large number of modes and FIG. 5 shows a gap in their representation after the 12th mode until an $n^{th}$ mode is reached.

When the beam 56 is excited by energy containing many resonant frequencies, the beam exhibits vibration in each of its corresponding modes, the vibration characteristics of each mode being substantially independent of those of the other excited modes. As the applied resonant frequencies become increasingly higher than the fundamental or first resonant frequency, the beam's vibration pattern becomes substantially independent of its end conditions.

A thin plate or panel may be regarded as a two dimensional beam, and resonant vibrations may be induced in the panel by analogy to resonant vibrations of the beam. Furthermore, if the energy applied to the beam, or to a panel, includes many higher order resonant frequencies, and none below the 10th resonant frequency, for example, the vibration response of the beam will be quite uniform throughout its area. Multimodal fixtures according to the present invention generate vibration responses having such spatial uniformity, by having the capacity to exhibit many higher order bending modes within any test frequency band of interest, without exhibiting the first few modes which are characterized by high amplitudes and low spatial uniformity. It should be noted that at these higher frequencies, multimodal fixtures have a large number of resonant modes close together in frequency in any bandwidth, so that the introduction of a small amount of damping causes the modes to overlap, thereby smoothing the fixture response with respect to frequency.

Multimodal fixtures may be comprised of a combination of flexible members, each exhibiting a resonant mode when excited by a particular frequency of applied oscillatory energy. The fixture vibrates in many modes, since the total vibration of the composite system approximates the sum of the component vibrations. However, the number of modes of the fixture vibration can be increased if each of the component members has many resonant modes and the applied oscillatory energy includes many resonant frequencies. Accordingly, vibration tests may be performed utilizing multimodal fixtures where the oscillatory energy contains a particular frequency bandwidth, and may be repeated for different bandwidths. Alternatively, tests may be performed by exciting the fixture with oscillatory energy of a single frequency, or with oscillatory energy of time varying frequency such as a sine sweep, and measuring the fixture response as a function of frequency.

Turning to FIG. 6, a side view of a preferred embodiment of a multimodal fixture according to the present invention is shown. A system 62 of flexible members is sandwiched between a first flexible plate or panel 64 and a second flexible plate or panel 66. The first panel 64 is adapted to be coupled to a vibration exciter, or a plurality of vibration exciters, and the total flexible structure generates a multimodal vibration field in the second panel 66, which is adapted to be coupled to the equipment under test and to apply the multimodal vibration field to the equipment. The flexible panels 64, 66 may be either flat or curved, such as a portion of a cylinder.

The combination of the flexible panels 64, 66 and the system 62 of flexible members provides a fixture of great modal density. It is the system 62 of flexible members, in particular, which makes the greatest contribution to the modal density of the fixture.

The system 62 of flexible members may include an assemblage of flexible beam members, and the beam members may have any shape with respect to both their lengths and cross sections, as long as flexibility is preserved. A side view of one possible beam configuration is shown in FIG. 7, in which an assemblage of flexible beams 68 is coupled between the first and second panels 64, 66. Although the beams 68 are shown in FIG. 7 as being arranged in a particular orderly fashion, other beam configurations are possible which include other orderly arrangements as well as random arrangements.

Such beam configurations further include assemblages of wirework, such as a wire network 70 as shown in FIG. 8. A side view of a possible wire network configuration is shown in FIG. 8a, while a plan view of a possible type of wire network 70 is shown in FIG. 8b. Other types of wirework may be utilized in the flexible system 62, such as an assemblage of coiled wire 72 shown in FIG. 9.

Other examples of the preferred embodiment of FIG. 6, utilizing different configurations of the system 62 of flexible members, are possible. For example, in FIG. 10 there is shown an assemblage of thin, flexible plates 74 coupled between the first and second panels 64, 66. The plates 74 may be either orderly or randomly arranged.

In FIG. 11, there is shown a first alternative embodiment of a multimodal fixture according to the present invention, in which a plurality of beams 76 is coupled to a first surface 78 of a flexible panel 80. The uncoupled ends of the beam 76 are interconnected, for example at a central location 82, forming a truss network 84. Excitation may be supplied to the truss network 84 either by a single vibration exciter (not shown) coupled to the beam interconnection location 82, or by a plurality of smaller vibration exciters positioned throughout the truss network 84. A second surface 86 of the panel 80 is adapted to be coupled to the equipment under test (not shown), for applying the multimodal vibration field to the equipment.

Similarly, a plurality of truss networks may be provided, such as a dual truss network included in a second alternative embodiment of a multimodal fixture, shown in FIG. 12. Two truss networks 88, 90 are provided, each comprised of a plurality of beams 92. In this example, each truss network 88, 90 has a point of interconnection 94, 96, respectively, to which vibration exciters may be coupled, although exciters may be coupled to the truss networks at other locations. The multimodal vibration field is applied to the equipment under test when the equipment is mounted to a flexible panel 98 coupled to the truss networks 88, 90.

A third alternative embodiment of a multimodal fixture is shown in FIG. 13, and comprises a simple, flexible panel 100. In normal operation, the equipment under test is mounted to a first surface 102 of the panel and a plurality of vibration exciters 104 are coupled to a second surface 106 of the panel for applying multifrequency energy thereto.

As shown in FIG. 14, a fourth alternative embodiment of a multimodal fixture utilizes an assemblage 108 of flexible members 110, such as beams or plates, coupled to a first surface 112 of a flexible panel 114. A plurality of vibration exciters 116 are coupled to a second surface 118 of the panel 114, and the equipment under test is mounted to this second surface.

In FIG. 15, there is shown a plan view of a fifth alternative embodiment of a multimodal fixture which has particular utility for "systems tests," i.e., for testing the functional integrity of a complete system such as a spacecraft. A first flexible cylinder 120 is provided, which may be several feet in diameter. A second flexible cylinder 122 is positioned concentrically within the first flexible cylinder 120, and a system 124 of flexible members (for example, beams or plates, as discussed in conjunction with the various configurations of the preferred embodiment of FIGS. 6 through 10) is coupled therebetween. The equipment to be tested is coupled to the second cylinder, for example, by means of mounting brackets 126, and excitation is applied to the first cylinder 120 by means of a plurality of vibration exciters 128.

A sixth alternative embodiment of a multimodal fixture, shown in FIG. 16, also has particular utility for systems vibration tests. A truss network 130 of flexible members 132 (for example, beams or plates) is coupled to the interior surface 134 of a cylinder 136. The cylinder 136 is excited by a plurality of vibration exciters 138 which may be positioned on the exterior surface 140 of the flexible cylinder 136. The equipment to be tested may be mounted to the flexible cylinder 136, for example, by means of mounting brackets 142.

Other embodiments of multimodal fixtures according to the present invention may be designed for simulating specific vibration fields produced by a particular aerospace vehicle. Such embodiments include a "section of the aerospace vehicle," as defined earlier, and at least one assemblage of flexible structure (or multimodal elements) is coupled to the section in order to enrich its modal density.

For example, a seventh alternative embodiment of a multimodal fixture is shown in FIG. 17, in which a plurality of flexible members 144 (such as beams or plates) are coupled to the boundaries of a section 146 of a particular aerospace vehicle. Excitation may be applied to a first surface 148 of the section, and the equipment under test may be mounted to a second surface 150 of the section.

As a further example of the seventh alternative embodiment, shown in FIGS. 18a and 18b, a section 152 of a particular aerospace vehicle is modally enriched by the attachment thereon of rolls of wire network 154 at the boundaries 156 of the section.

Besides coupling multimodal elements to the section's boundaries, the modal density of a particular aerospace section may be enriched by coupling multimodal elements to a surface of the section, in similar fashion to the preferred fixture embodiment of FIGS. 6 through 10, and the alternative embodiments of FIGS. 11, 12, 14, 15 and 16.

For example, in FIG. 19, there is shown an example of an embodiment of a multimodal fixture in which a section 158 of a particular aerospace vehicle is utilized. A truss network 160 of interconnected beams 162 is coupled to one surface of the section 158, in the same manner that, in the first alternative embodiment (FIG. 11), the truss network 84 is coupled to the flexible panel 80.

As a further example, the multimodal fixture shown in FIG. 20 comprises a cylindrical section 164 of a particular aerospace vehicle, and includes a truss network 166 of flexible members 168 (such as beams or plates) coupled to its interior surface 170. This fixture is similar to the sixth alternative embodiment (FIG. 16) in which the flexible cylinder 136 is replaced by the cylindrical aerospace section.

Thus, there has been described a method for vibration testing equipment required to function in vibration environments occurring in aerospace structure. The method includes the generation of multimodal vibration fields which are applied to equipment under test, for simulating the vibration environments of the equipment in-flight. Further, various embodiments of multimodal test fixtures for utilization with the method of the present invention have been described.

Other embodiments of apparatus to practice the method of the present invention, and modification of the embodiments herein presented, may be developed without departing from the essential characteristics thereof. For example, multimodal structures other than those specifically presented herein, may be incorporated in a multimodal fixture without departing from the scope of the present invention. Furthermore, the test method should not be restricted to simulating aerospace vibration environments, but may be utilized to simulate other multimodal vibration environments.

Accordingly, the invention should be limited only by the scope of the claims appended below.

What is claimed as new is:

1. Apparatus for generating a diffuse, reverberant vibration field and for applying the generated vibration field to equipment under test, comprising the combination of:

first means adapted to be coupled to the equipment under test and having structure for sustaining therein a diffuse, multi-resonant vibration field and for applying said field to the equipment;

second means coupled to said first means and adapted to cause said first means to vibrate simultaneously in a multiplicity of diffuse, resonant vibration modes when excited by applied oscillatory energy; and means for applying oscillatory energy to said second means and for thereby generating a multimodal vibration field in said first means.

2. Apparatus according to claim 1, above, wherein:
   said first means has an inherent modal density and
   said second means alters said inherent modal density to create a predetermined modal density in said first means, the multimodal vibration field generated in response to applied oscillatory energy being characterized by said predetermined modal density.

3. Apparatus for generating a vibration field and for applying the generated field to equipment under test, comprising the combination of:
   first means including a first flexible member adapted to be coupled to the equipment under test for applying a vibration field generated therein to the equipment;
   second means including a second flexible member of substantially similar contour to said first flexible member and positioned substantially parallel thereto, and a system of third flexible members, said system being positioned between said first and second flexible members and coupled thereto,
   said second means being coupled to said first means and adapted to cause said first means to vibrate simultaneously in a plurality of vibration modes when excited by applied oscillatory energy; and
   means for applying oscillatory energy to said second means and for thereby generating a multimodal vibration field in said first means.

4. Apparatus according to claim 3, above, wherein said first and second flexible members are flexible plates.

5. Apparatus according to claim 3, above, wherein said first flexible member is a first flexible cylinder, and said second flexible member is a second flexible cylinder concentric to said first cylinder.

6. Apparatus according to claim 3, above, wherein said first flexible member is a section of an aerospace vehicle.

7. Apparatus according to claim 3, above, wherein said system of third flexible members includes an assemblage of flexible plates.

8. Apparatus according to claim 3, above, wherein said system of third flexible members includes an assemblage of flexible beams.

9. Apparatus for generating a vibration field when oscillatory energy is applied thereto, and for applying the generated field to equipment under test, comprising the combination of:
   first means adapted to be coupled to the equipment under test for applying a diffuse, reverberant vibration field generated therein to the equipment, said first means comprising a first flexible member; and
   second means coupled to said first means and adapted to cause said first means to vibrate simultnaeously in a plurality of vibration modes when excited by applied oscillatory energy, said apparatus generating a multimodal vibration field in said first means,
   said second means comprising a system of second flexible members, said system being coupled to said first flexible member.

10. Apparatus according to claim 9, above, wherein said first flexible member is a flexible plate.

11. Apparatus according to claim 9, above, wherein said first flexible member is a flexible cylinder.

12. Apparatus according to claim 9, above, wherein said first flexible member is a section of an aerospace vehicle.

13. Apparatus according to claim 9, above, wherein said system of second flexible members includes at least one assemblage of flexible beams, each of said assemblages being coupled to said first flexible member.

14. Apparatus according to claim 9, above, wherein said system of second flexible members includes at least one assemblage of flexible plates, each of said second flexible members being coupled to said first flexible member.

15. Apparatus for generating a vibration field and for applying the generated field to equipment under test, comprising the combination of:
   at least one source of oscillatory energy which includes a plurality of frequency components; and
   a flexible member coupled to each of said sources and adapted to be coupled to the equipment under test and to respond selectively to said energy by vibrating in a plurality of vibration modes excited by particular frequency components of said energy, for generating a multimodal vibration field in said member when said energy is applied thereto, and further adapted to be coupled to the equipment under test for applying the generated field to the equipment.

16. A method of testing equipment in vibration comprising the steps of:
   coupling the equipment to a fixture adapted to sustain therein a diffuse, multi-resonant vibration field including a multiplicity of vibration modes when oscillatory energy is applied thereto;
   applying oscillatory energy to said fixture and thereby generating in response to said energy a diffuse, multi-resonant vibration field on said fixture which is thereupon applied to the equipment;
   measuring a multi-resonant vibration level at a representative location on said fixture; and
   adjusting said applied oscillatory energy to modify said diffuse, multi-resonant vibration field for correspondence thereof to predetermined test specifications, while noting the functional integrity of the equipment.

17. The method according to claim 16, above, wherein said oscillatory energy is applied to said fixture by means of a plurality of energy sources coupled thereto.

* * * * *